(12) United States Patent
Arsego

(10) Patent No.: US 12,204,352 B2
(45) Date of Patent: Jan. 21, 2025

(54) BLOCKING DEVICE FOR PIPELINES FOR THE PASSAGE OF PRESSURIZED GAS, OF THE PILOT-OPERATED TYPE, AND PRESSURE REGULATOR FOR SAID BLOCKING DEVICE

(71) Applicant: PIETRO FIORENTINI S.p.A., Arcugnano (IT)

(72) Inventor: Alberto Arsego, Torri di Quartesolo (IT)

(73) Assignee: PIETRO FIORENTINI S.P.A., Arcugnano (IT)

( * ) Notice: Subject to any disclaimer, the term of this patent is extended or adjusted under 35 U.S.C. 154(b) by 0 days.

(21) Appl. No.: 18/029,961

(22) PCT Filed: Oct. 28, 2021

(86) PCT No.: PCT/IB2021/059985
§ 371 (c)(1),
(2) Date: Apr. 3, 2023

(87) PCT Pub. No.: WO2022/090996
PCT Pub. Date: May 5, 2022

(65) Prior Publication Data
US 2023/0376053 A1    Nov. 23, 2023

(30) Foreign Application Priority Data

Oct. 29, 2020   (IT) .................. 102020000025681

(51) Int. Cl.
G05D 16/16       (2006.01)
G05D 16/00       (2006.01)

(52) U.S. Cl.
CPC ......... *G05D 16/166* (2013.01); *G05D 16/028* (2019.01)

(58) Field of Classification Search
CPC .. G05D 16/166; G05D 16/04; G05D 16/0028; G05D 16/028; F16K 31/122
See application file for complete search history.

(56) References Cited

U.S. PATENT DOCUMENTS

2014/0150902 A1* 6/2014 Pirat ................... F16K 31/1245
                                                        137/487.5
2014/0182694 A1* 7/2014 Cheron ................ G05D 16/166
                                                        137/12

(Continued)

FOREIGN PATENT DOCUMENTS

DE    102011056521 A1    6/2013
EP         2707645 A1    3/2014
WO      2012153310 A1    11/2012

*Primary Examiner* — Robert K Arundale
(74) *Attorney, Agent, or Firm* — Carmel Patent Agency; Robert Ballarini

(57) ABSTRACT

Blocking device for pressurized gas pipelines includes:
a blocking valve, which includes:
  a connection body;
  a movable shutter;
  a stem carrying the shutter;
  a fluid-dynamic actuator, configured to translate the stem;
  thrust means to bring the shutter from an operating position of opening to an operating position of complete closure;
  a control system for controlled actuation of the fluid-dynamic actuator, having a by-pass group for equalizing upstream pressures in an upstream chamber and downstream pressures in a downstream chamber, and a pressure reducer group interconnected with the bypass group, the pressure reducer group configured to receive a motorization fluid at a supply pressure as input, and to supply the fluid-dynamic actuator with a motorization pressure through a motorization line, (Continued)

the control system having a pressure differential selector that detects a signal of the upstream pressure and a signal of the supply pressure.

12 Claims, 6 Drawing Sheets

(56) References Cited

U.S. PATENT DOCUMENTS

| | | |
|---|---|---|
| 2018/0275694 A1 | 9/2018 | Imboccioli |
| 2021/0116045 A1* | 4/2021 | Garvey ................. F16K 17/105 |
| 2023/0229179 A1* | 7/2023 | Cecchinato .......... G05D 16/166 |
| | | 137/12 |

* cited by examiner

BLOCKING DEVICE FOR PIPELINES FOR THE PASSAGE OF PRESSURIZED GAS, OF THE PILOT-OPERATED TYPE, AND PRESSURE REGULATOR FOR SAID BLOCKING DEVICE

FIELD OF THE INVENTION

The invention relates to a blocking device for pipelines for the passage of pressurized gas, of the pilot-operated type, as well as a pressure regulator for said blocking device.

BACKGROUND

Various types of blocking devices for pipelines for the passage of pressurized gas are known nowadays, among which one type particularly important is that of the blocking devices of the pilot-operated type.

This type of pilot-operated blocking devices generally comprises a blocking valve, which in turn comprises a connection body, for the connection between an upstream pipe and a downstream pipe; an upstream chamber connected to the upstream pipe, a downstream chamber connected to said downstream pipe, a passage opening between these upstream and downstream chambers, and a movable shutter for obstructing said passage opening are defined inside the connection body; the blocking valve also comprises a stem carrying the movable shutter and a fluid-dynamic actuator configured to translate the stem along the main axis of the stem itself.

Elastic thrust means are also generally present, normally a helical spring, configured to bring the movable shutter from an operating position to an emergency position of complete closure or complete opening; generally, the emergency position is fully closed and the elastic thrust means are configured to push the movable shutter against the edges of the passage opening in order to obstruct it tightly.

The blocking device, in addition to the blocking valve, comprises a control and by-pass system, configured to perform the controlled actuation of the fluid-dynamic actuator as well as to create a by-pass of the blocking valve itself in order to restore the balance of pressures between the upstream chamber and the downstream chamber following an activation of the blocking valve and in order to allow the reset of the blocking valve itself.

This control and by-pass system therefore comprises a by-pass group for equalizing the pressures in the upstream chamber and in the downstream chamber, and a pressure reducer group; this pressure reducer group is interconnected with the by-pass group, and is configured to supply the fluid-dynamic actuator with a motorization fluid at a predetermined motorization pressure.

Through the pressure reducer, the movable shutter of the blocking valve is moved to open, in order to start the gas distribution line on which the blocking device is installed, or in order to reset the blocking valve following an emergency activation to close the blocking valve itself.

The control and by-pass system also comprises a switch group configured to compare the downstream pressure, detected by a downstream pipe, with a maximum calibration pressure and with a minimum calibration pressure, and to operate the closure of the blocking valve following a too high pressure signal or a too low pressure signal, compared to the calibration pressures.

The switch group comprises a two-position slide valve:
a first position configured to operate the opening of a discharge line of the motorization pressure of the fluid-dynamic actuator and the closure of a motorization line of the fluid-dynamic actuator, with consequent closure of the blocking valve;
a second position configured to operate the closure of the discharge line and the opening of the motorization line, with consequent opening of the blocking valve.

The switch group comprises a pressure switch, connected via a signal line to a downstream pipe so as to detect the downstream pressure; this pressure switch allows the switching of the slide valve from the second position to the first position if it detects a lower or higher downstream pressure than corresponding minimum and maximum values of the calibration pressure.

This switch group also comprises a manual closing button for the blocking valve, configured to manually determine the first position in the two-position slide valve, and a reset lever for manually reopening the blocking valve, configured to determine the second position in the same two-position slide valve.

The by-pass group comprises a by-pass line configured to put the upstream chamber in connection with the downstream chamber of the blocking valve, and a three-way valve of the 'push' type; this three-way valve divides the by-pass line into two sections, an upstream by-pass section and a downstream by-pass section.

This three-way valve is configured in such a way as to present a normally open passage that connects the upstream by-pass section with the pressure reducer, and a diverter body connected to a by-pass button; the by-pass button, manually pressed by an operator, causes the pressurized fluid to deviate from the upstream by-pass section to the downstream by-pass section, with consequent progressive balancing of the pressures between the upstream chamber and the downstream chamber.

When a pressure gauge on a downstream signal line shows that the pressures have been equalized, then the operator can release the by-pass button, with consequent passage of the pressurized fluid towards the pressure reducer, and operate the lever to reset the switch group, so as to put the pressure reducer back in communication with the fluid-dynamic actuator for moving the shutter, and move the movable shutter away from the passage opening, with consequent opening of the blocking valve.

This type of blocking devices, although widespread and popular, has certain limitations.

A first limitation concerns the fact that in this blocking device the blocking valve can be reset manually even if the upstream and downstream pressures have not been equalized within the safety pressure range.

A reset situation that occurs at a time when there is still a pressure difference between upstream and downstream that is greater than the safety range may lead to downstream water hammer events, with consequent risk of damage to the equipment located downstream of the blocking device.

A second limitation of the pilot-operated blocking device of the known type consists in the fact that the slide valve is constantly stressed by the pressurized fluid coming from the motorization line, i.e. from the pressure reducer, at every moment in which the by-pass line is closed, i.e. when the upstream pressure is diverted to the pressure reducer; this continuous stress can cause a premature wear of some components of the slide valve.

SUMMARY

The task of the present invention is to develop a blocking device for pipelines for the passage of pressurized gas, of the pilot-operated type, capable of obviating the aforementioned drawbacks and limitations of the prior art.

In particular, an object of the invention is to develop a piloted-operated blocking device in which the opening of the blocking valve is prevented until the upstream pressure and the downstream pressure are correctly balanced.

Another object of the invention is to develop a blocking device capable of better protecting the components located downstream of the pressure reducer. A further object of the invention is to develop a blocking device which is simple to install in the same way as the blocking devices of the known type.

The above-mentioned task and objects are achieved by a blocking device for pipelines for the passage of pressurized gas, of the pilot-operated type, according to the appended claims.

Further characteristics of the blocking device are also achieved as set forth in the appended claims.

BRIEF DESCRIPTION OF THE DRAWINGS

The aforesaid task and objects, together with the advantages that will be mentioned hereinafter, are indicated by the description of an embodiment of the invention, which is given by way of non-limiting example with reference to the attached drawings, where.

DETAILED DESCRIPTION OF THE PREFERRED EMBODIMENTS

Figure 1:
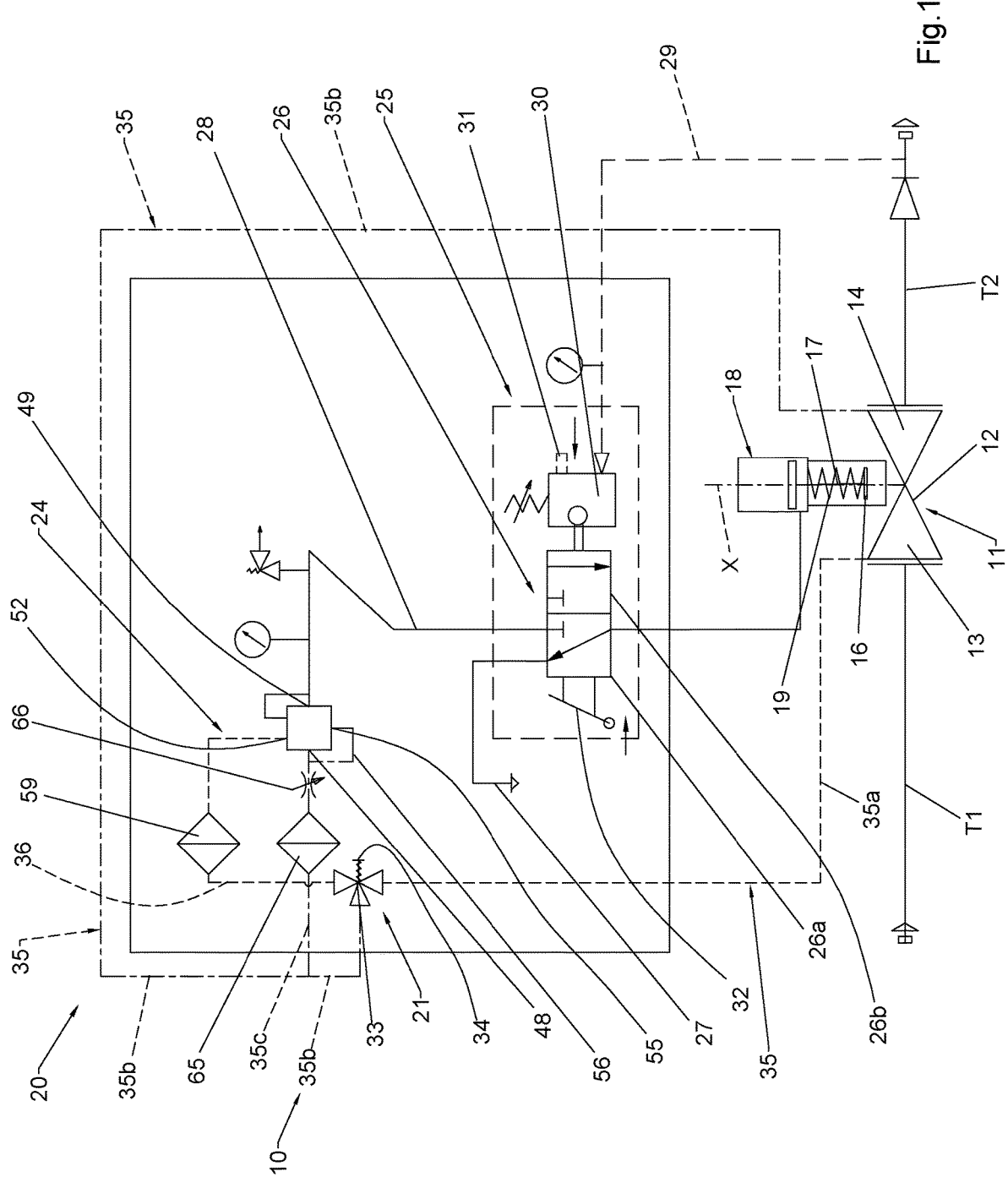
FIG. 1 represents a schematic drawing of the blocking device according to the invention.

With reference to the above cited figures, a blocking device for pipelines for the passage of pressurized gas, of the pilot-operated type, according to the invention is indicated overall by numeral 10.

This blocking device 10 comprises:
a blocking valve 11, in turn comprising:
a connection body 12, for the connection between an upstream pipe T1 and a downstream pipe T2, inside which there are defined an upstream chamber 13, inside which there is an upstream pressure P1, connected to said upstream pipe T1, a downstream chamber 14, inside which there is a downstream pressure P2, connected to said downstream pipe T2, and a passage opening 15 between the upstream 13 and the downstream 14 chambers; —a movable shutter 16, for obstructing the passage opening 15; this movable shutter 16 is to be understood as consisting of a single body or of a plurality of components which are in any case integral with each other;
a stem 17 carrying the movable shutter 16, the movable shutter 16 being fixed to the stem 17;
a fluid-dynamic actuator 18 configured to translate the stem 17 along the main axis X of the same stem 17;
thrust means 19 configured to bring the movable shutter 16 from an operating position of opening to an operating position of complete closure.

The blocking device 10 also comprises:
a control system 20 for the controlled actuation of the fluid-dynamic actuator 18, which control system 20 in turn comprises a by-pass group 21 for equalizing the pressures in the upstream chamber 13 and in the downstream chamber 14, and a pressure reducer group 22 interconnected with the by-pass group 21; the pressure reducer group 22 is configured to receive a motorization fluid at a supply pressure Pa as input and to supply the fluid-dynamic actuator 18 with a motorization pressure P3 through a motorization line 28.

The peculiarity of the blocking device 10 according to the invention lies in the fact that the control system 20 comprises a pressure differential selector device 23 configured to detect a signal of an upstream pressure P1 and a signal of the supply pressure Pa of a motorization fluid entering said pressure reducer 22, and to alternately determine:
the passage of a motorization fluid through said pressure reducer 22 towards said fluid-dynamic actuator 18 if the pressure difference P4 between said upstream pressure P1 and said supply pressure Pa is less than a predetermined balancing pressure difference Peq;
the interception of the motorization fluid and the failure to supply said fluid-dynamic actuator 18 if the pressure difference between said upstream pressure P1 and said supply pressure Pa is greater than or equal to the balancing pressure difference Peq.

Figure 2:
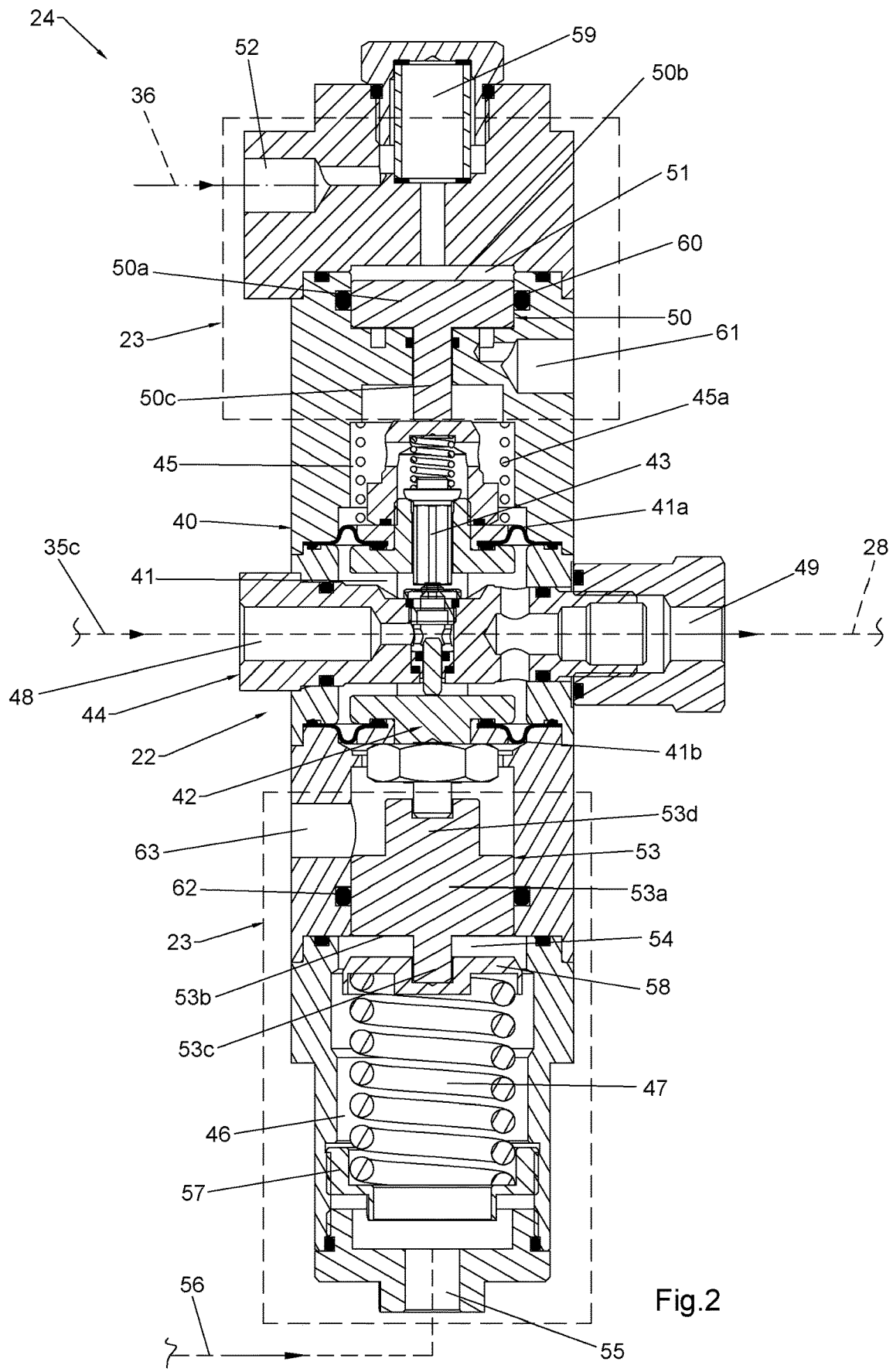
FIG. 2 represents a sectional side view of a pressure regulator according to the invention.
Figure 3:
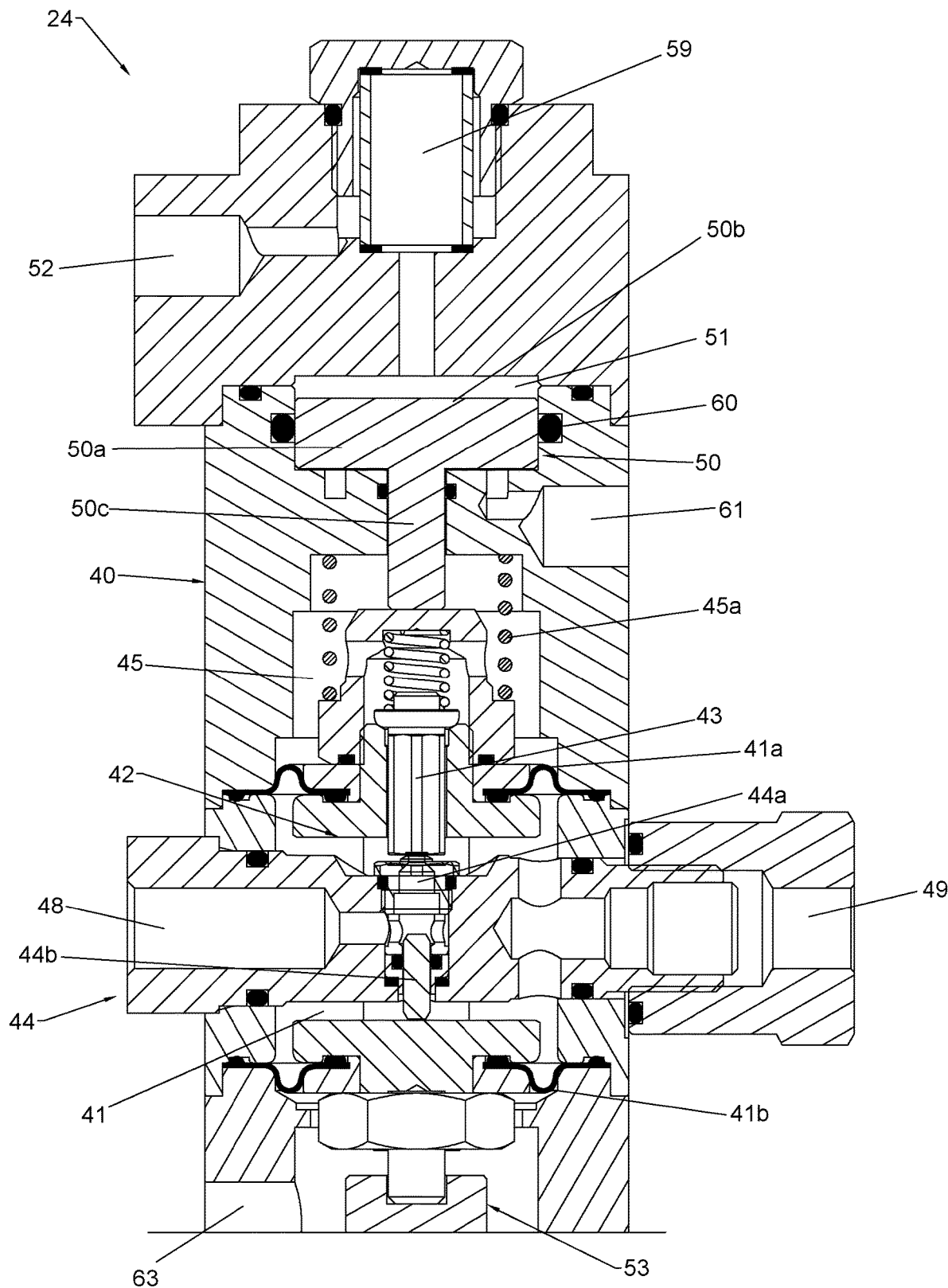
FIG. 3 represents a detail of FIG. 2.
Figure 4:
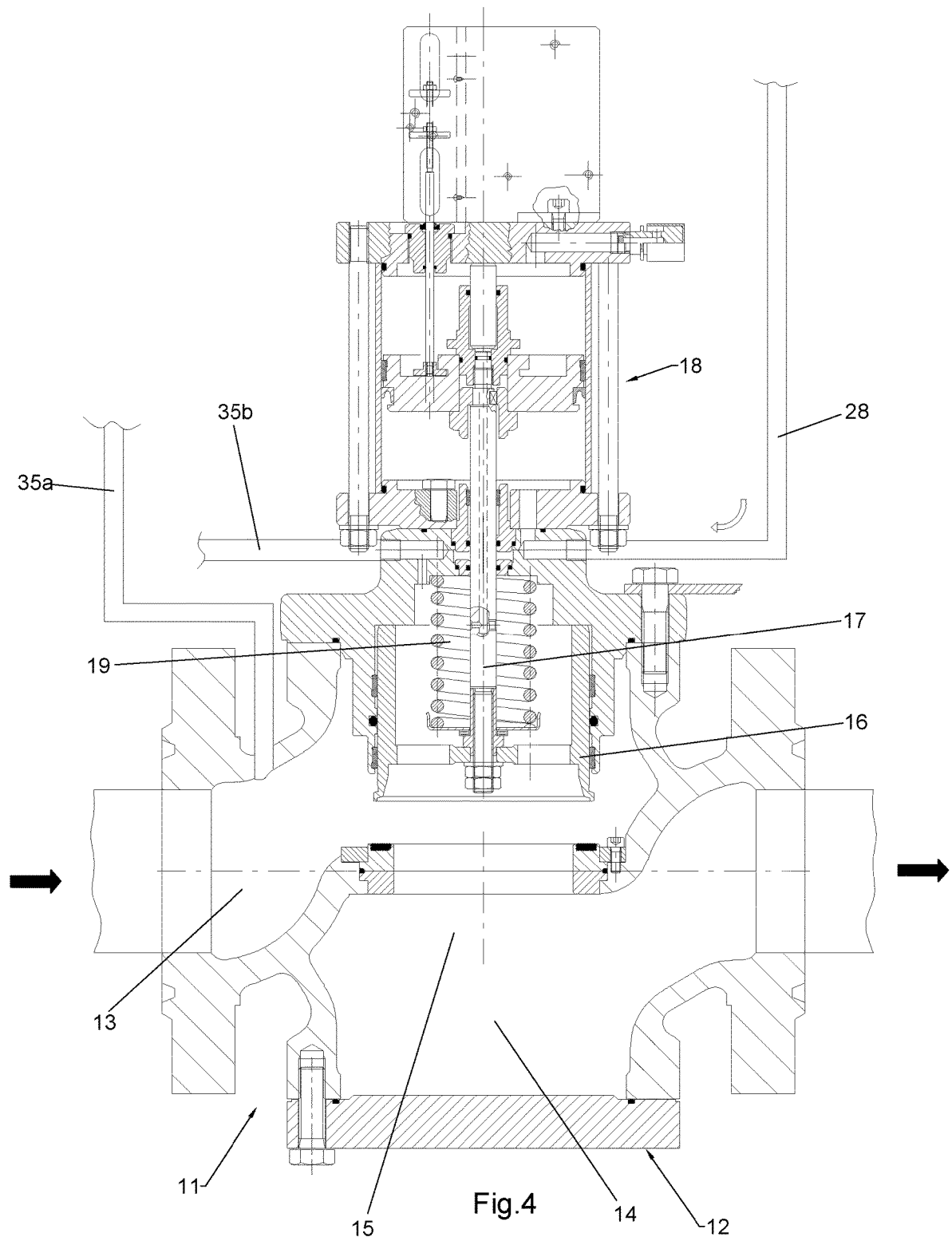
FIG. 4 represents a schematic side view of a group of components of the device according to the invention.

In the embodiment described here by way of non-limiting example of the invention, the pressure reducer 22 and the pressure differential selector device 23 are integrated in a single pressure regulator 24, which is well illustrated in FIGS. 2 and 3.

Figure 5:
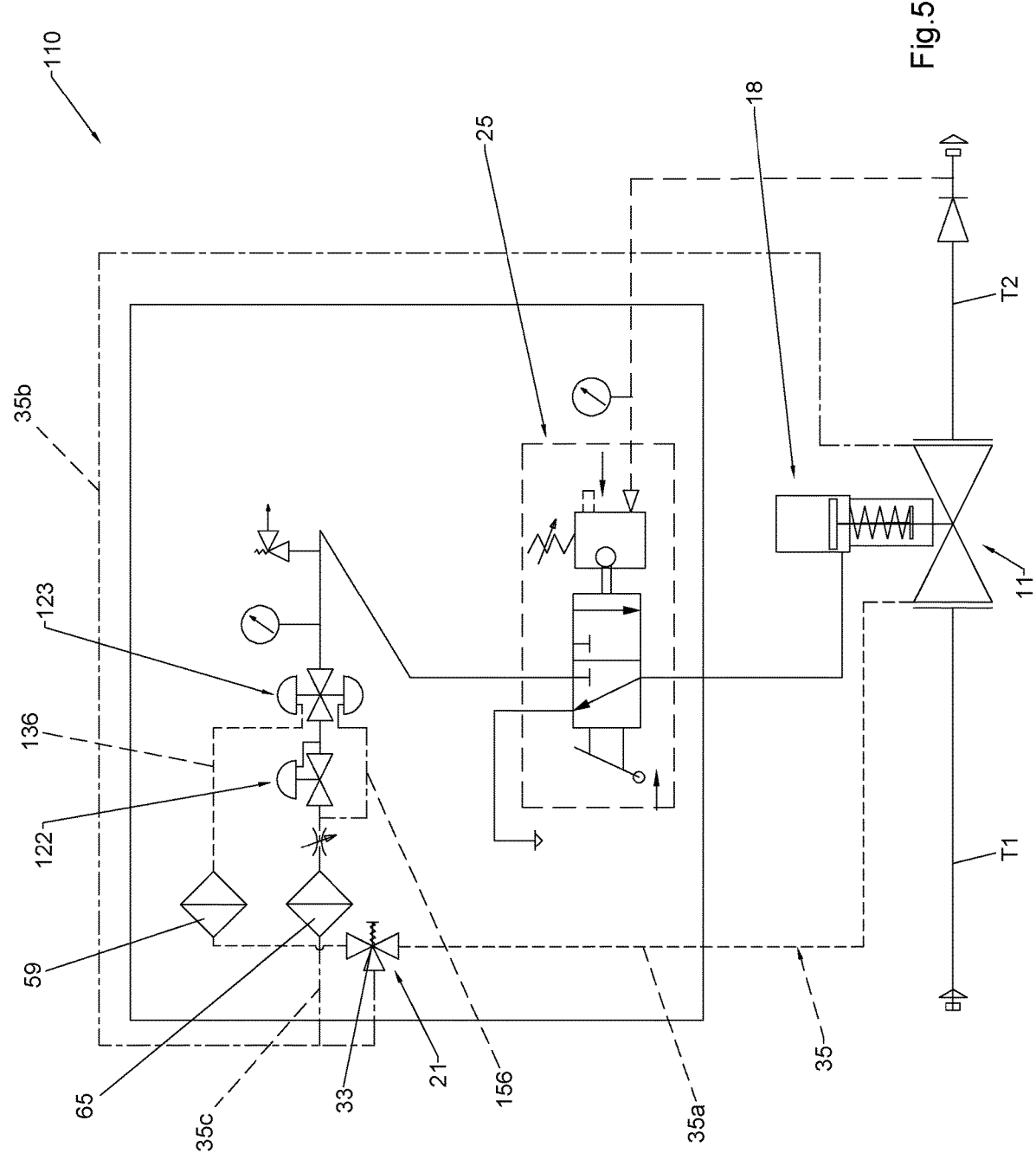
FIG. 5 represents a schematic drawing of a variant embodiment of the blocking device according to the invention.

In a variant embodiment of the blocking device according to the invention, schematized in FIG. 5 and indicated therein with number 110, the pressure reducer 122 and the pressure differential selector device 123 are constituted by two distinct bodies connected to each other in series; in this variant, the pressure reducer 122 and the pressure differential selector device 123 are to be understood to be of a known type.

In the present embodiment, the fluid-dynamic actuator 18 is of the single-action type, and is configured to move the movable shutter 16 away from a perimeter edge of the passage opening 15.

The thrust means 19 consist, for example, of a helical thrust spring, configured and positioned to operate with thrust on the stem 17 or on the movable shutter 16, so as to move the latter towards or against the perimeter edge of the passage opening 15.

The control and by-pass system 20 also comprises a switch group 25 configured to compare a downstream pressure, detected through a downstream signal line 29 in a downstream pipe T2, with a calibration pressure range Pset, and to operate the closure of the blocking valve 11 following a higher downstream pressure signal or a lower downstream pressure signal, than the calibration pressure range Pset.

The downstream signal line 29 is generally connected to a line that is downstream of another pressure regulator or of another valve which in turn is downstream of the blocking valve 11.

As a general rule, it is to be understood that the downstream pressure detected by the downstream signal line 29 may be different from the downstream pressure P2 present in the downstream chamber 14 of the blocking valve 11, depending on the configuration of the line located downstream of the movable shutter 16 of the blocking valve 11, wherein this line belongs to the plant in which the blocking device 10 is inserted.

The switch group 25 comprises a two-position slide valve 26:
- a first position 26a configured to operate the opening of a discharge line 27 for the exit of the motorization fluid from the fluid-dynamic actuator 18 and the simultaneous closure of the motorization line 28, which connects the pressure reducer 22 with the fluid-dynamic actuator 18 itself, with consequent closure of the blocking valve 11;
- a second position 26b configured to operate the closure of the discharge line 27 and the opening of the motorization line 28, with actuation of the fluid-dynamic actuator 18, with distancing of the movable shutter 16 from the passage opening 15 and consequent opening of the blocking valve 11.

The switch group 25 comprises a pressure switch 30, connected through the downstream signal line 29 to a downstream pipe T2 so as to detect a downstream pressure; this pressure switch allows the switching of the slide valve 26 from the second position 26b to the first position 26a if it detects a lower or higher downstream pressure than corresponding limit values of the calibration pressure range Pset.

This switch group 25 also comprises an activation button 31 for manually closing the blocking valve 11, configured to manually determine the first position 26a in the slide valve 26.

This switch group 25 also comprises a reset lever 32 for manually reopening the blocking valve 11, this reset lever 32 being configured to determine the second position 26b in the same slide valve 26.

The by-pass group 21 comprises:
- a by-pass line 35 configured to put the upstream chamber 13 in connection with the downstream chamber 14 of the blocking valve 11,
- and a three-way valve 33.

Such a three-way valve 33 is preferably of the 'push' type, and comprises a manually operable by-pass button 34; the three-way valve 33 is configured such that action on the by-pass button 34 results in the opening of the by-pass line 35.

In particular, this three-way valve 33 divides the by-pass line 35 into two sections, an upstream by-pass section 35a and a downstream by-pass section 35b The upstream by-pass section 35a connects the upstream chamber 13 of the blocking valve 11 with an inlet of the three-way valve 33.

The downstream by-pass section 35b connects a downstream point, preferably the downstream chamber 14, with an outlet of the three-way valve 33.

This three-way valve 33 is configured to show:
- a normally open signal passage, for connection between the upstream by-pass section 35a and an upstream signal line 36 of the upstream pressure P1;
- a normally closed by-pass passage, for connection between the upstream by-pass section 35a and the downstream by-pass section 35b.

The normally closed by-pass passage is opened by actuating the by-pass button 34.

The normally open signal passage remains permanently open.

In the present embodiment, the pressure regulator 24 incorporates, as mentioned above, the pressure reducer 22.

This pressure reducer 22 in turn comprises:
- a containment structural body 40 having inside it a reduction chamber 41 defined between an upper membrane 41a and a lower membrane 41b, which are fixed to the containment structural body 40 itself;
- a movable equipment 42 with a shutter 43, this movable equipment 42 being fixed to the upper 41a and lower 41b membranes and being placed inside the reduction chamber 41;
- a reduction valve 44 placed to cross transversely the containment structural body 40 and the movable equipment 42, this reduction valve 44 having an axial reduction hole 44a, facing the shutter 43, and an opposite counterthrust axial pin 44b, resting on an internal face of the movable equipment 42;
- an upper thrust chamber 45, defined above the upper membrane 41a, into which the motorization fluid enters through one or more passages defined on the shutter 43;
- a lower thrust chamber 46, defined below the lower membrane 41b, inside which a calibration spring 47 is positioned.

The reduction valve 44 has an inlet mouth 48 and an outlet mouth 49.

The pressure regulator 24 also comprises the pressure differential selector 23.

In the embodiment of the invention described here, by way of non-limiting example of the invention itself, the pressure differential selection device 23 comprises:
- an upper pusher 50, placed inside the containment structural body 40 and configured to operate with thrust on the movable equipment 42;
- an upper differential selection chamber 51, defined in the containment structural body 40, inside which the upper pusher 50 is free to translate in axial direction;
- an upper mouth 52, configured to connect the upper differential selection chamber 51 with the upstream signal line 36;
- a lower pusher 53, placed inside the containment structural body 40 and configured to operate with thrust on the movable equipment 42 on the opposite side with respect to the upper pusher 50;
- a lower differential selection chamber 54, defined in the containment structural body 40, inside which the lower pusher 53 is free to translate in axial direction;
- a lower mouth 55, configured to connect the lower differential selection chamber 54 with a signal line 56 of a supply pressure Pa of a motorization fluid entering said pressure reducer 22.

In particular, in the present embodiment, the lower pusher 53 is interposed between the calibration spring 47 and the movable equipment 42.

In the present embodiment, the lower differential selection chamber 54 coincides with the lower thrust chamber 46 in which the calibration spring 47 operates.

In the embodiment described herein, the upper pusher 50 comprises a first piston 50a placed to translate in the upper differential selection chamber 51, wherein there is a sealing ring 60 configured to prevent gas leakages from the upper differential selection chamber 51 towards an upper vent hole 61.

The first piston 50a defines a thrust surface 50b on which the upstream pressure P1 present in the upper differential selection chamber 51 acts.

A thrust stem 50c develops from the first piston 50a and whose length is such that it comes into contact with the movable equipment 42, and in particular with the upper end of the movable equipment 42.

In the embodiment described herein, the lower pusher 53 comprises a second piston 53a placed to translate in the lower differential selection chamber 54, wherein there is a sealing ring 62 configured to prevent gas leakages from the lower differential selection chamber 54 towards a lower vent hole 63.

The second piston 53a defines a thrust surface 53b on which the supply pressure Pa of the motorization fluid acts.

The calibration spring 47 is pressed between a bottom shoulder 57, fixed to the containment structural body 40, and a thrust plate 58.

The second piston 53a comprises a first resting projection 53c configured to rest against the thrust plate 58.

The second piston 53a comprises a second resting projection 53d configured to rest against the movable equipment 42.

A closing spring 45a is provided in the upper thrust chamber 45 and which is configured to keep the movable equipment 42 in the closed position of the pressure reducer 22 in the event of a lack of pressures in the pressure reducer 22 itself.

In a variant embodiment of the invention, not illustrated for simplicity's sake, the upper pusher comprises a membrane element defining a motorization small chamber into which the upstream pressure P1 enters, instead of a piston with a sealing ring.

In a variant embodiment of the invention, not illustrated for simplicity's sake, the lower pusher comprises a membrane element defining a motorization small chamber into which the supply pressure Pa enters, instead of a piston with a sealing ring.

The motorization fluid reaches the inlet mouth 48 of the reduction valve 44 through a supply line 35c.

In the present non-limiting embodiment of the invention itself, this supply line 35c is directly connected to the downstream by-pass section 35b; this supply line 35c determines the use, as a motorization fluid, of gases having a supply pressure Pa which corresponds to the pressure present in the by-pass line 35 between upstream chamber 13 and downstream chamber 14, referred to as 'by-pass pressure'; consequently, the by-pass pressure reaches through the signal line 56 the lower differential selection chamber 54.

Similarly, also in the first variant of the blocking device 110, the supply line 35c is directly connected to the downstream by-pass section 35b.

In the first variant of the blocking device 110, the signal line 156 connects the lower differential selection chamber 54 of the pressure differential selector device 123 to bring therein the supply pressure Pa of a motorization fluid entering said pressure reducer 122, with the supply line 35c upstream of the pressure reducer 122.

In such first variant of the blocking device 110, the three-way valve 33 has a normally open signal passage configured to connect the upstream by-pass section 35a and an upstream signal line 136 of the upstream pressure P1, wherein the upstream signal line 136 is connected to the upper differential selection chamber of the pressure differential selector device 123.

Figure 6:
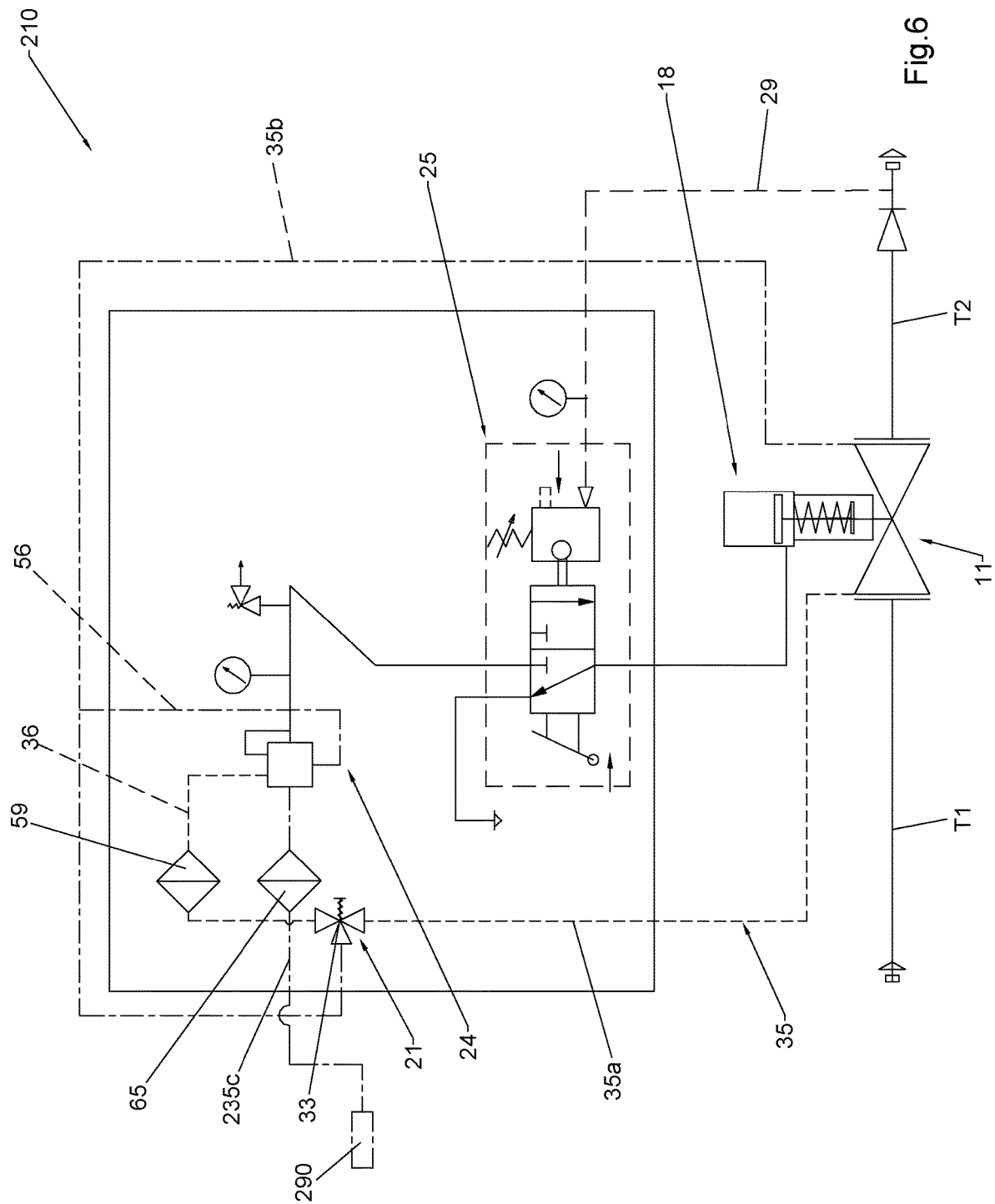
FIG. 6 represents a schematic drawing of a further variant embodiment of the blocking device according to the invention.

In an alternative embodiment, schematized in FIG. 6, the blocking device 210 comprises a supply line 235c which is an external supply line and the motorization fluid is a fluid such as compressed air, or nitrogen from a cylinder, or other similar and equivalent fluids; this supply line 235c is therefore not connected to the by-pass line 35 nor to other pressure lines of the blocking device 10.

The supply line 235c is connected to an external source 290, which may be a compressed air source or a nitrogen cylinder.

In this variant embodiment, the signal line 56 for the lower differential selection chamber 54 of the pressure differential selector device 23 is connected to the downstream section 35b of the by-pass line 35, similarly to what has been described above.

This second variant embodiment can also be integrated into the first variant embodiment of the blocking device 110 described above.

The other components of the blocking device 10, of the blocking device 110 in the first variant, and of the blocking device 210 in the second variant embodiment are intended to be the same.

A first filter 59 is placed on the upstream signal line 36 for filtering the gas coming from the upstream chamber 13.

In particular, in the above-mentioned embodiments, the first filter 59 is positioned inside the structural body 40 on the passage between the upper mouth 52 and the upper differential selection chamber 51.

A second filter 65 is placed on the supply line 35c for filtering the motorization fluid before it enters the pressure reducer 22.

A throttling device 66 configured to delay the passage of the motorization fluid from the downstream section 35b of the by-pass line 35 may also be present on the supply line 35c, favoring the transit of gas from the upstream chamber 13 to the downstream chamber 14 for balancing the downstream pressure P2 with the upstream pressure P1.

The operation of the blocking device 10 according to the invention is described below.

When there is a drop in the downstream pressure downstream of the blocking valve 11 below a minimum calibration pressure of the switch group 25, this pressure signal reaches the pressure switch 30 of the switch group 25, which makes the slide valve 26 trigger in the first position 26a.

It is to be understood that the activation of the switch group 25 also occurs when, through the downstream signal line 29, the pressure switch 30 detects an increase in the downstream pressure above the maximum calibration pressure of the switch group 25; even in this case, the pressure switch 30 would trigger the slide valve in the first position 26a.

The first position 26a of the slide valve 26 causes the discharge of the fluid-dynamic actuator 18 and the closure of the blocking valve 11.

The upstream signal line 36 is always pressurized at the upstream pressure P1; the pressure reducer 22 is therefore normally closed.

For the blocking valve 11 to be reset, an operator presses the by-pass button 34, causing the transit of gas at the upstream pressure P1 from the upstream chamber 13 towards the downstream chamber 14.

The three-way valve 33 thus determines the connection between the upstream section 35a of the by-pass line 35 with the downstream section 35b of the by-pass line 35 itself.

The by-pass line 35 is crossed by pressurized gas at a by-pass pressure.

Through the supply line 35c, which is directly connected to the downstream section 35b, the gas at the by-pass pressure reaches the inlet mouth 48 of the reduction valve 44 of the pressure reducer 22 as motorization fluid, and a by-pass pressure signal reaches the lower differential selection chamber 54 through the supply pressure signal line 56 which is connected to the supply line 35c.

This results therefore in a situation in which:

the movable equipment 42 of the pressure reducer 22 is pushed by the upper pusher 50, under the action of the upstream pressure P1, so that the closed position of the reduction valve 44 is maintained, with consequent no passage of motorization fluid towards the fluid-dynamic actuator 18;

the same movable equipment 42 is pushed by the lower pusher 53, under the action of the supply pressure Pa, which is constituted by the by-pass pressure, or under the action of another supply pressure Pa coming from an external pneumatic line, in the opening direction of the reduction valve 44.

The upper pusher 50, the lower pusher 53 and the calibration spring 47 are configured in such a way that the reduction valve 44 opens only when the difference between the upstream pressure P1 and the by-pass pressure is less than a predetermined safety value, i.e. the predetermined value of the balancing pressure difference Peq, for example below a safety pressure difference comprised between 2 bar and 4 bar.

Thanks to the pressure differential selection device 23, the pressure reducer 22 opens and works, reducing the pressure of the motorization fluid to a motorization pressure of, for example, about 4 bar, only when the upstream pressure P1 and the supply pressure Pa, which may be the by-pass pressure, or may be the downstream pressure P2, are equalized below a safety value Peq of the difference of the two pressures.

In this way, even if an operator were to operate the reset lever 32 inappropriately before the upstream P1 and downstream P2 pressures are sufficiently equalized, the fluid-dynamic actuator 18 would not be motorized because the pressure reducer 22 would remain closed and inoperative.

As a general rule, it is to be understood that the downstream pressure detected by the downstream signal line 29 may be different from the downstream pressure P2, which is present in the downstream chamber 14 of the blocking valve 11, which becomes supply pressure Pa through the supply line 35c, and which also reaches the lower differential selection chamber 54 of the differential selection device 23 and 123 through the signal line 56 and 156; this difference in the downstream pressure at different points of the line downstream of the shutter of the blocking valve 11 depends on the specific configuration of the plant.

The invention also relates to a pressure regulator 24, particularly for blocking devices for pipelines for the passage of pressurized gas, characterized by incorporating in a single containment structural body 40 a pressure reducer 22 and a pressure differential selection device 23 configured to compare two operating pressures and to operate the opening or closure of the pressure reducer 22 depending on the pressure difference between these two operating pressures; the pressure differential selection device 23 comprises two pressure differential selection chambers:

an upper differential selection chamber 51, supplied with a first operating pressure, defined in the containment structural body 40, inside which an upper pusher 50 is free to translate in axial direction, in turn configured to operate with thrust on said pressure reducer 22 according to a first thrust direction, a lower differential selection chamber 54, supplied with a second operating pressure, defined in the containment structural body 40, inside which a lower pusher 53 is free to translate in axial direction, in turn configured to operate with thrust on said pressure reducer 22 according to a second thrust direction, opposite to said first thrust direction.

The pressure reducer 22 and the pressure differential selection device 23 are intended so that they can be as described above.

Any other variant in which the pressure reducer is structured differently but is technically equivalent is to be understood as being included in the invention.

In particular, the pressure regulator 24 is characterized in that said pressure differential selection device 23 comprises:

an upper pusher 50, placed inside the containment structural body 40 and configured to operate with thrust on the movable equipment 42;

an upper differential selection chamber 51, defined in the containment structural body 40, inside which the upper pusher 50 is free to translate in axial direction;

an upper mouth 52, configured to connect the upper differential selection chamber 51 with a first signal line of a first operating pressure;

a lower pusher 53, placed inside the containment structural body 40 and configured to operate with thrust on the movable equipment 42 on the opposite side with respect to the upper pusher 50;

a lower differential selection chamber 54, defined in the containment structural body 40, inside which the lower pusher 53 is free to translate in axial direction;

a lower mouth 55, configured to connect the lower differential selection chamber 54 with a second signal line of a second operating pressure.

It has in practice been established that the invention achieves the intended task and objects.

In particular, the invention has developed a pilot-operated blocking device in which the opening of the blocking valve is prevented until the upstream pressure and the downstream pressure are properly balanced.

In addition, the invention has developed a blocking device capable of better protecting the components placed downstream of the pressure reducer, since the slide valve is not affected by a motorization pressure, except when the upstream and downstream pressures are equalized; in fact, in case the blocking valve is activated, the control system is not supplied, since the supply pressure is taken downstream of the shutter of the blocking valve, the latter being closed. In this situation, as there is no supply pressure, there is also no motorization pressure reaching the slide valve.

In addition, the invention has developed a blocking device which is simple to install in the same way as blocking devices of the known type.

The invention thus conceived is susceptible of numerous modifications and variations, all of which are within the scope of the inventive concept; moreover, all the details may be replaced by other technically equivalent elements.

In practice, the components and materials used, as well as the dimensions and the contingent shapes can be anyone according to the requirements and the prior art, as long as they are compatible with the specific use.

If the characteristics and techniques mentioned in any claim are followed by reference signs, these reference signs are to be intended for the sole purpose of increasing the intelligibility of the claims and, consequently, such reference signs have no limiting effect on the interpretation of each element identified by way of example by these reference signs.

The invention claimed is:

1. A blocking device for pipelines for the passage of pressurized gas, the blocking device comprising:
a blocking valve, in turn comprising:
a connection body, for connection between an upstream pipe and a downstream pipe, inside which there are defined an upstream chamber, having an upstream pressure therein, connected to said upstream pipe, a downstream chamber, having a downstream pressure therein, connected to said downstream pipe, and a passage opening between said upstream and downstream chambers;

a movable shutter, for obstructing said passage opening;

a stem carrying said movable shutter, said movable shutter being fixed to said stem;

a fluid-dynamic actuator configured to translate said stem along a main axis of said stem itself;

thrust means configured to bring said movable shutter from an open operating position to a closed operating position;

the blocking device also comprising:
 a control system for the controlled actuation of said fluid-dynamic actuator, comprising a by-pass group for equalizing the upstream pressure in said upstream chamber and the downstream pressure in said downstream chamber, and a pressure reducer group interconnected with said by-pass group, said pressure reducer group being configured to receive a motorization fluid at a supply pressure as input, and to supply said fluid-dynamic actuator with a motorization pressure through a motorization line, said control system comprises a pressure differential selector device configured to detect a signal of said upstream pressure and a signal of said supply pressure and to determine alternatively:
 the passage of a supply fluid through said pressure reducer towards said fluid-dynamic actuator if the pressure difference between said upstream pressure and said supply pressure is less than a predetermined balancing pressure difference;
 the interception of said supply fluid and the failure to supply said fluid-dynamic actuator if the pressure difference between said upstream pressure and said supply pressure is greater than or equal to said balancing pressure difference.

2. The blocking device according to claim 1, wherein said pressure reducer and said pressure differential selector device are integrated in a single pressure regulator.

3. The blocking device according to claim 1, wherein said fluid-dynamic actuator is a single-action type and is configured to move said movable shutter away from a perimeter edge of the passage opening.

4. The blocking device according to claim 1, wherein said thrust means consist of a helical thrust spring, configured and positioned to operate with thrust on said stem or on said movable shutter, so as to move the movable shutter towards or against a perimeter edge of said passage opening.

5. The blocking device according to claim 1, wherein said control system comprises a switch group configured to compare the downstream pressure, detected through a downstream signal line inside a downstream pipe, with a calibration pressure range, and to operate the closure of the blocking valve following a higher downstream pressure signal or a lower downstream pressure signal than the calibration pressure range.

6. The blocking device according to claim 5, wherein said switch group comprises a two-position slide valve:
 a first position configured to operate the opening a discharge line of the motorization fluid from said fluid-dynamic actuator and the simultaneous closure of said motorization line, which connects said pressure reducer with said fluid-dynamic actuator itself, with consequent closure of the blocking valve;
 a second position configured to operate the closure of said discharge line and the opening of said motorization line, with actuation of said fluid-dynamic actuator, with distancing of the movable shutter from the passage opening and with consequent opening of the blocking 18 valve;

said switch group comprising a pressure switch, connected through said downstream signal line to a downstream pipe so as to detect the downstream pressure, said pressure switch being configured to allow the switching of said slide valve from said second position to said first position if it detects a lower or higher downstream pressure than corresponding limit values of said calibration pressure range.

7. The blocking device according to claim 1, wherein said switch group comprises a reset lever for manually reopening the blocking valve, such reset lever being configured to determine said second position in said slide valve.

8. The blocking device according to claim 1, wherein said by-pass group comprises:
 a by-pass line configured to put said upstream chamber in connection with said downstream chamber of the blocking valve,
 and a three-way valve, said three-way valve dividing said by-pass line into two sections, an upstream by-pass section and a downstream by-pass section, said upstream by-pass section being adapted to connect said upstream chamber of said blocking valve with an inlet of said three-way valve, said downstream by-pass section being adapted to connect a downstream point with an outlet of said three-way valve,
 said three-way valve being configured to show:
 a normally open signal passage, for connection between said upstream by-pass section and an upstream signal line of the upstream pressure;
 a normally closed by-pass passage, for connection between said upstream by-pass section and said downstream by-pass section, said normally closed by-pass passage being opened by the actuation of a by-pass button of said three-way valve, said normally open signal passage remaining constantly open.

9. The blocking device according to claim 1, wherein said pressure reducer comprises:
 a containment structural body with a reduction chamber therein, defined between an upper membrane and a lower membrane which are fixed to said containment structural body itself;
 a movable equipment with a shutter, said movable equipment being fixed to the upper and lower membranes and being placed inside said reduction chamber;
 a reduction valve placed to cross transversely said containment structural body and said movable equipment, said reduction valve having an axial reduction hole, facing said shutter, and an opposite counter-thrust axial pin, resting on an internal face of the movable equipment;
 an upper thrust chamber, defined above the upper membrane, into which the motorization fluid enters through one or more passages defined on said shutter;
 a lower thrust chamber, defined below the lower membrane, inside which a calibration spring is positioned.

10. The blocking device according to claim 9, wherein said pressure differential selector device comprises:

an upper pusher, placed inside said containment structural body and configured to operate with thrust on the movable equipment;

an upper differential selection chamber, defined in said containment structural body, inside which said upper pusher is free to translate in axial direction;

an upper mouth, configured to connect said upper differential selection chamber with an upstream signal line of the upstream pressure;

a lower pusher, placed inside said containment structural body and configured to operate with thrust on said movable equipment on the opposite side with respect to said upper pusher;

a lower differential selection chamber, defined in said containment structural body, inside which said lower pusher is free to translate in axial direction;

a lower mouth, configured to connect said lower differential selection chamber with a signal line of the supply pressure of a motorization fluid entering said pressure reducer.

11. The blocking device according to claim 9, wherein said motorization fluid reaches the inlet mouth of said reduction valve through a supply line.

12. The blocking device according to claim 11, wherein said supply line is connected directly to said downstream by-pass section, said supply line determining the use, as motorization fluid, of gas having a pressure which corresponds to the pressure present in the by-pass line between the upstream chamber and the downstream chamber.

* * * * *